(12) United States Patent
Colvin et al.

(10) Patent No.: US 7,806,081 B2
(45) Date of Patent: Oct. 5, 2010

(54) NECTAR FEEDER

(75) Inventors: Barry D. Colvin, Bristol, RI (US);
Kenneth M. DiOrio, Warren, RI (US)

(73) Assignee: Aspects, Inc., Warren, RI (US)

( * ) Notice: Subject to any disclaimer, the term of this patent is extended or adjusted under 35 U.S.C. 154(b) by 113 days.

(21) Appl. No.: 12/102,571

(22) Filed: Apr. 14, 2008

(65) Prior Publication Data

US 2009/0255476 A1    Oct. 15, 2009

(51) Int. Cl.
*A01K 7/00* (2006.01)

(52) U.S. Cl. .................................................. 119/72

(58) Field of Classification Search ............ 119/72, 119/57.8, 75, 77, 74, 76; D30/124, 127, D30/128
See application file for complete search history.

(56) References Cited

U.S. PATENT DOCUMENTS

| 330,272 | A | | 11/1885 | Stewart | |
|---|---|---|---|---|---|
| 382,376 | A | | 5/1888 | Murphy | |
| 2,430,541 | A | | 11/1947 | Thatcher | |
| 2,586,979 | A | | 2/1952 | Myers | |
| 3,291,100 | A | | 12/1966 | Negaard | |
| 3,292,589 | A | | 12/1966 | Williams | |
| 3,301,220 | A | * | 1/1967 | Queen | 119/77 |
| 3,913,527 | A | * | 10/1975 | Kilham | 119/74 |
| 4,261,294 | A | | 4/1981 | Bescherer | |
| 4,328,636 | A | | 5/1982 | Johnson | |
| 4,361,116 | A | | 11/1982 | Kilham | |
| 4,881,491 | A | | 11/1989 | Brown | |
| 4,942,845 | A | | 7/1990 | Lane | |
| 5,033,411 | A | | 7/1991 | Brucker | |
| 5,062,390 | A | * | 11/1991 | Bescherer et al. | 119/72 |
| D330,272 | S | | 10/1992 | Lane | |
| 5,269,258 | A | * | 12/1993 | Brown | 119/57.9 |
| D360,710 | S | | 7/1995 | Colwell | |
| 5,507,249 | A | | 4/1996 | Shaw | |
| D380,878 | S | * | 7/1997 | Brown | D30/124 |
| D382,376 | S | | 8/1997 | Bescherer | |
| 5,682,835 | A | | 11/1997 | Walter et al. | |
| 5,848,731 | A | * | 12/1998 | Deering | 222/129 |
| 5,881,675 | A | | 3/1999 | Shaffer | |

(Continued)

OTHER PUBLICATIONS

"Hummingbird Feeder Mounts on a Window", http://www.birdwatching.com/birdfeeders/hummerfeederwindowmount.html.

(Continued)

*Primary Examiner*—Timothy D Collins
*Assistant Examiner*—Monica Williams
(74) *Attorney, Agent, or Firm*—Barlow, Josephs & Holmes, Ltd.

(57) ABSTRACT

A nectar feeder for birds has a body member with a base and a lid. The base has an open top end and a side wall. The lid is interfittingly engaged with the top end of the base. A hinge connects the lid to the base to allow movement of the lid relative to the base. The lid has a support extending from an upper surface of the lid. At least one feed port, preferably three, is defined through the lid. The feed port and the support are substantially aligned on the same horizontal plane. A latch is attached to the upper surface of the lid to prevent movement of the lid relative to the base. A moat optionally extends about the periphery of the body member.

12 Claims, 15 Drawing Sheets

U.S. PATENT DOCUMENTS

| | | | |
|---|---|---|---|
| 5,964,189 | A | 10/1999 | Northrop et al. |
| 6,311,641 | B1 * | 11/2001 | Johnson ................ 119/57.8 |
| 6,463,878 | B1 | 10/2002 | Moody |
| 6,659,041 | B1 | 12/2003 | Curts |
| D524,490 | S | 7/2006 | Obenshain |
| 7,162,972 | B2 | 1/2007 | Stachowiak |
| 7,234,418 | B2 | 6/2007 | Fort, II et al. |
| 2001/0029899 | A1 | 10/2001 | Arlitt |
| 2005/0211178 | A1 | 9/2005 | Stone |
| 2006/0037546 | A1 | 2/2006 | Jung et al. |
| 2006/0090707 | A1 | 5/2006 | Donegan |
| 2006/0096545 | A1 * | 5/2006 | Cone et al. ............ 119/61.53 |
| 2006/0118055 | A1 | 6/2006 | Kuelbs |
| 2007/0056519 | A1 * | 3/2007 | Palmer ................ 119/57.8 |

OTHER PUBLICATIONS

"Droll Yankees WH Window Hummingbird Feeder", http://www.amazon.com/Droll-Yankees-WH-Window-Hummingbird/dp/B00004ZB4R.

Pennsylvania Game Commission-State Wildlife Management Agency—Release #039-06, http://www.pgc.state.pa.us/pgc/lib/pgc/press/2006/media/hummer-sitting.jpg.

Nectar bar, http://www.backyardbird.com/nectarbar.html.

* cited by examiner

NECTAR FEEDER

BACKGROUND OF THE INVENTION

The present invention generally relates to bird feeders, namely nectar feeders. More specifically, the present invention relates to nectar feeders for birds, such as hummingbirds or orioles that provide an unobstructed view of the bird for an observer viewing the feeder.

Nectar feeders are well known in the art. Most nectar feeders include a storage compartment and a lid which define a uniform shape, such as a circle. The storage compartment is where the nectar or food is stored. A lid covers storage compartment to prevent birds and insects from gaining access. In many cases, the storage compartment and lid are attached together or integrally formed. To refill the storage compartment, refilling holes are defined within the lid for receipt of the nectar. Ultimately, the use of refilling holes is time consuming and sometimes wastes nectar by spreading out over the lid.

In the prior art, the cover contains feed hole openings through which the birds retrieve the nectar or food. In the prior art, the cover has a peripheral rim to serve as edge for birds during feeding. However, the peripheral rim used as a edge is usually positioned at a height near the feed hole openings. By positioning the rim near the feed hole openings, the view of a bird that is feeding is typically blocked by the nectar feeder unit. The blocking of the view of a bird is especially undesirable in a nectar feeder that is attached to a window or post in close proximity to an observer.

For example, U.S. Design Pat. No. 360,710 discloses a bird feeder known in the prior art. As shown in prior art FIG. 1, the bird feeder 1 contains a base 2, a lid 3, and a suction cup mount 4. The lid 3 and base 2 are fixedly connected. To refill the bird feeder, a refilling hole 5 is defined within the lid 3. Two feed ports 6 are positioned on the surface of the lid 3 above a raised peripheral edge 7 of the lid 3. The prior art bird feeder 1 has feed ports that are positioned, which prevent direct view of the entire bird during feeding by an observer because the body of the lid 3 blocks the view path of an observer.

In the prior art, the nectar feeders are known to attract ants. Ants will infiltrate nectar feeders to abscond with nectar reserved for the birds. Some prior art feeders may employ external devices to prevent access to the nectar by ants. By employing an external device, it requires more expense and time in setting and position the device which is not desirable.

Therefore, there is a need to refill the nectar within the storage compartment without wasting nectar or time. There is a need to have a clear and unobstructed view of a bird when sitting on a bird feeder. There is also a desire to employ an effective mechanism attached directly to the nectar feeder to thwart ants from stealing nectar.

BRIEF SUMMARY OF THE INVENTION

The present invention provides a solution to the problems associated with prior art nectar feeders. As shown in the attached figures, the nectar feeder of the present invention includes a new and novel raised support that provides an unobstructed view of a bird by an observer. Additionally, the present invention provides an ant moat attached to the nectar feeder that protects the nectar from attack by ants.

The nectar feeder of the present invention contains a body member having a base and a lid. The base has an open top end and a side wall. The lid is interfittingly engaged with the top end of the base. A hinge connects the lid to the base to allow movement of the lid relative to the base. Both the base and the lid together define a peripheral edge which may be non-linear. More specifically, the base and the lid may define a "half-moon" shape which allows for easier mounting to a window or other surface.

The lid has a raised non-uniform peripheral support extending from an upper surface of the lid. The raised non-uniform peripheral support, in one embodiment, has four support arms connected to the lid. For example, the support follows the shape and counter of peripheral edge of the lid.

At least one feed port, preferably three, is defined through the lid. A number of feed ports are defined through the lid to permit access to the nectar feed stored in a reservoir of the base. The feed port and the raised peripheral support substantially aligned on the same horizontal plane. By having the feed ports and the raised peripheral support substantially residing in the same horizontal plane, an observer enjoys an unobstructed view of a bird sitting on the raised peripheral support while feeding.

The base optionally resides in a seat defined by a moat or channel member extending about a periphery of the body member. The moat is filled with water or other fluids for preventing insects, such as ants, from gaining access to the nectar within the nectar feeder. The nectar feeder snaps into the moat to provide a substantially unitary device. The moat has a depth and width sufficient for holding water or other liquid suitable for fending off ants.

When the nectar feeder needs refilling with nectar, the lid, which is releasably secured to the base, is lifted up. A latch is attached to the upper surface of the lid to prevent movement of the lid relative to the base. The lid is hingedly connected to the base to allow movement of the lid relative to the base. When the user refills the nectar feeder, the lid is pivots away from the base to allow for easy refilling of the nectar feeder.

In operation, when a bird rests upon the raised support, an observer may have an unobstructed view of the entire bird. Since there is nectar contained in the reservoir in the base, the bird will stay longer on the raised support to provide more time for the bird watcher to enjoy the unobstructed view of the bird while the bird accesses nectar through the feed port.

The nectar feeder also includes a means for attachment to a variety of surfaces. The means for attachment may include a wall mounting, window mounting, or any other means for attachment. The surfaces for attachment include windows, posts, walls, or any other desired surface. Preferably, the nectar feeder is mounted to a window to provide unobstructed views of the bird by an observer.

Accordingly, an object of the present invention is the provision for a raised support substantially aligned on the same horizontal plane as the feed port to provide an unobstructed view of bird resting on the raised support.

Another object of the present invention is the provision for a lid which is hingedly connected to the base to facilitate refilling of the nectar.

In a further object of the present invention is the provision for a moat to prevent ants or other insects from reaching the feed ports and eating nectar reserved for the birds.

In yet another object of the present invention is the provision of a means for mounting the present invention to a variety of surfaces.

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE PREFERRED EMBODIMENTS

In FIGS. 2-15, the nectar feeder 10 of the present invention is shown. The nectar feeder 10 of the present invention includes a new and novel raised support 40 that is substantially aligned on the same horizontal plane as at least one feed port 60A-60C that provides an unobstructed view of a bird, such as a hummingbird or oriole to an observer.

Figure 1:
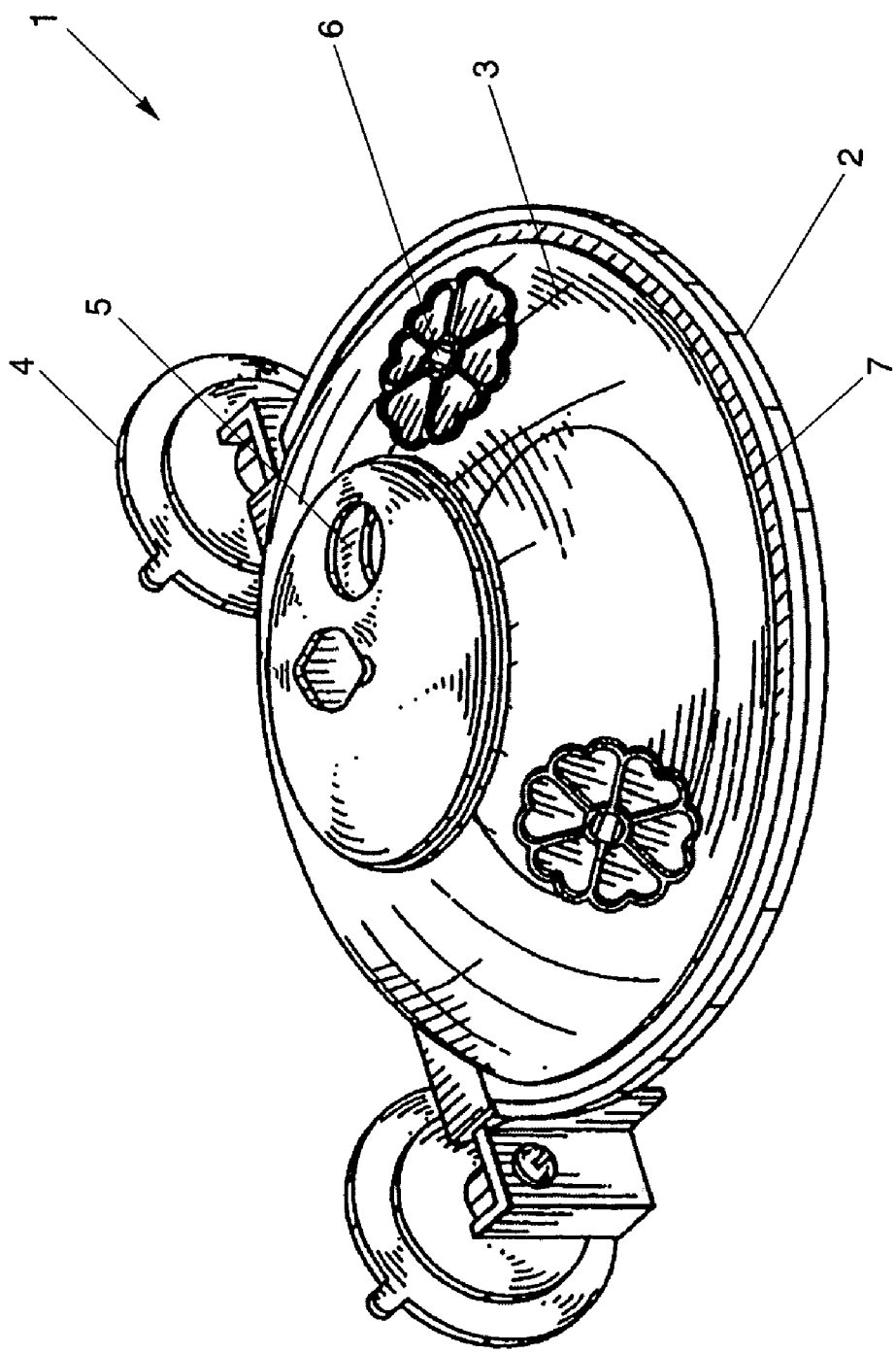
FIG. 1 is a perspective view of a prior art bird feeder.
Figure 2:
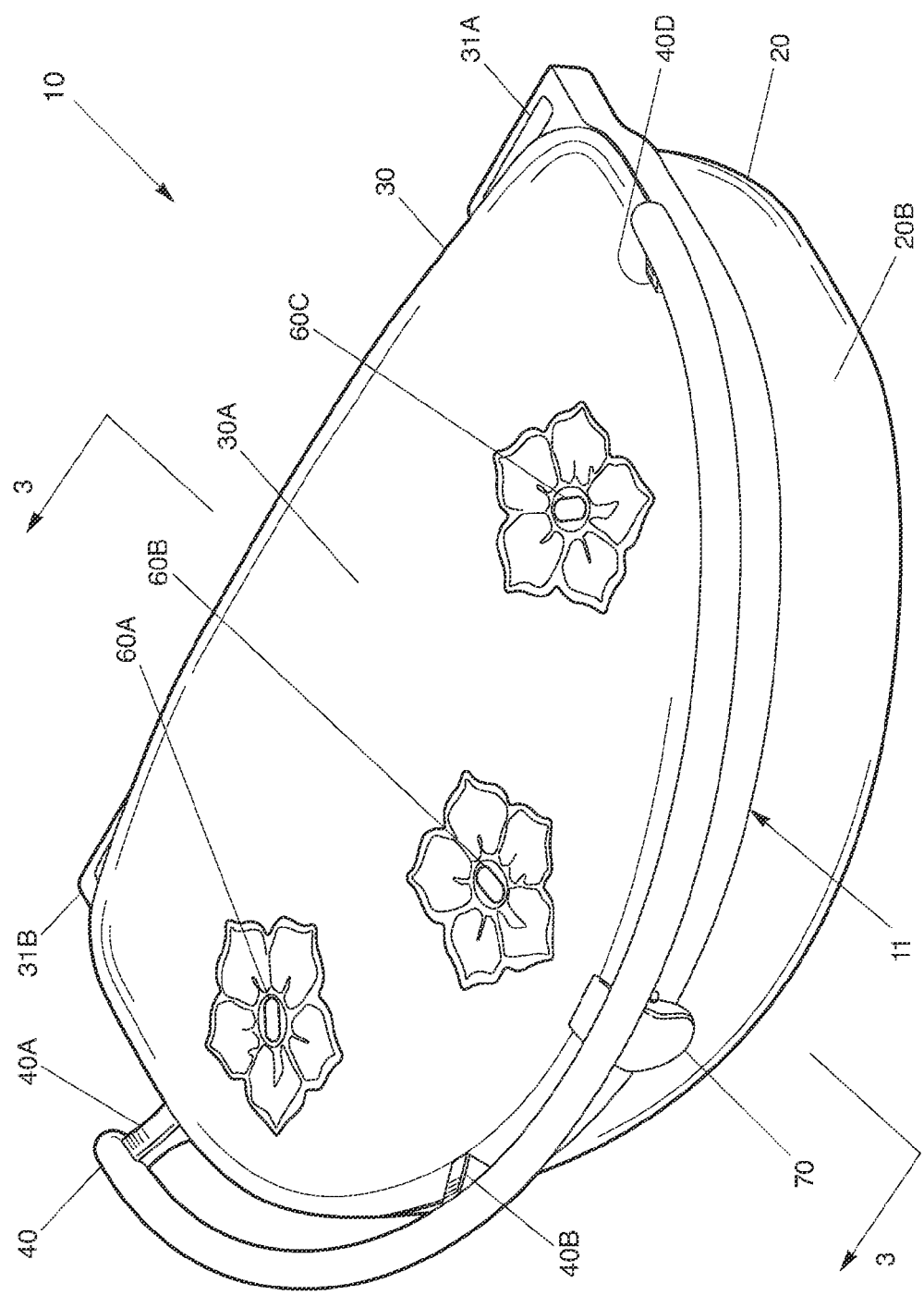
FIG. 2 is a perspective view of the present invention.

Referring to FIG. 2, the nectar feeder 10 of the present invention is a body member 11 having a lid 30 and a base 20. The base 20 has an open top end and a side wall. The lid 30 is interfittingly engaged with the open top end of the base 20. Both the base 20 and the lid 30 together define a peripheral edge which is preferably non-uniform and non-linear although this is not required. More specifically, the base 20 and the lid 30 may define a "half-moon" shape which allows for easier mounting to a window or other surface.

The lid 30 has a contour and color designed for feeding birds, such as hummingbirds. The lid 30 has a central portion 30A that is slightly raised. The central portion 30A of the lid 30 is raised to facilitate feeding by a bird while the bird is sitting on the raised support 40. Further, the lid 30 can be of different colors, such as red, to attract the desired type of bird, such as humming birds.

Figure 3:
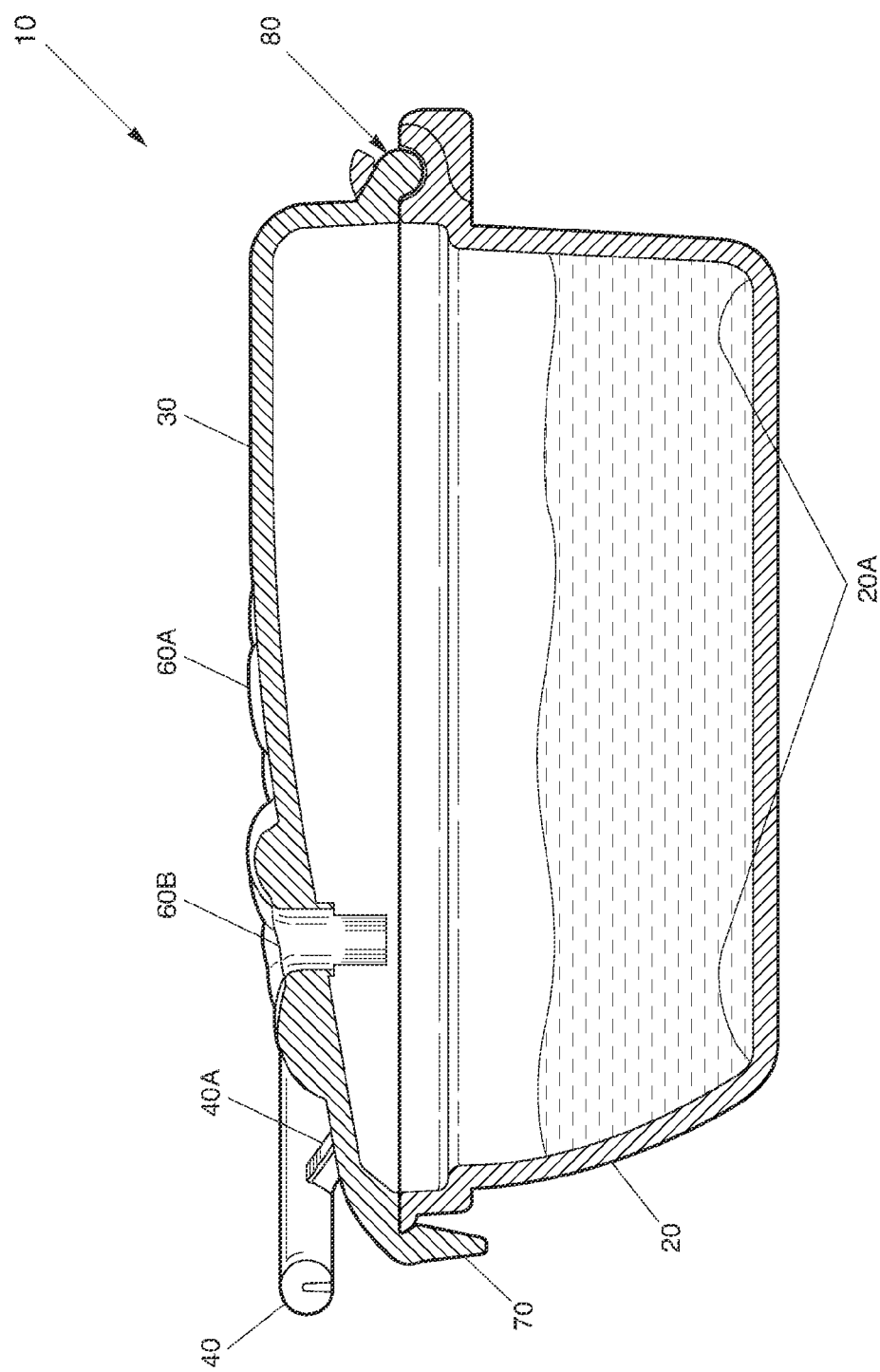
FIG. 3 is a cross-sectional view of the present invention through the line 3-3 of FIG. 2.

Referring to FIG. 3, the base 20 has several advantages over the prior art. First, the base 20 has a depth to define a reservoir to store nectar feeder and prevent nectar from undesirably splashing outside the nectar feeder 10. Furthermore, an inner surface 20A of the base 20 is substantially smooth and without any crevices which usually make for difficult cleaning. By having a smoother surface, a user can clean the base 20 more easily than prior art feeders.

Figure 4:
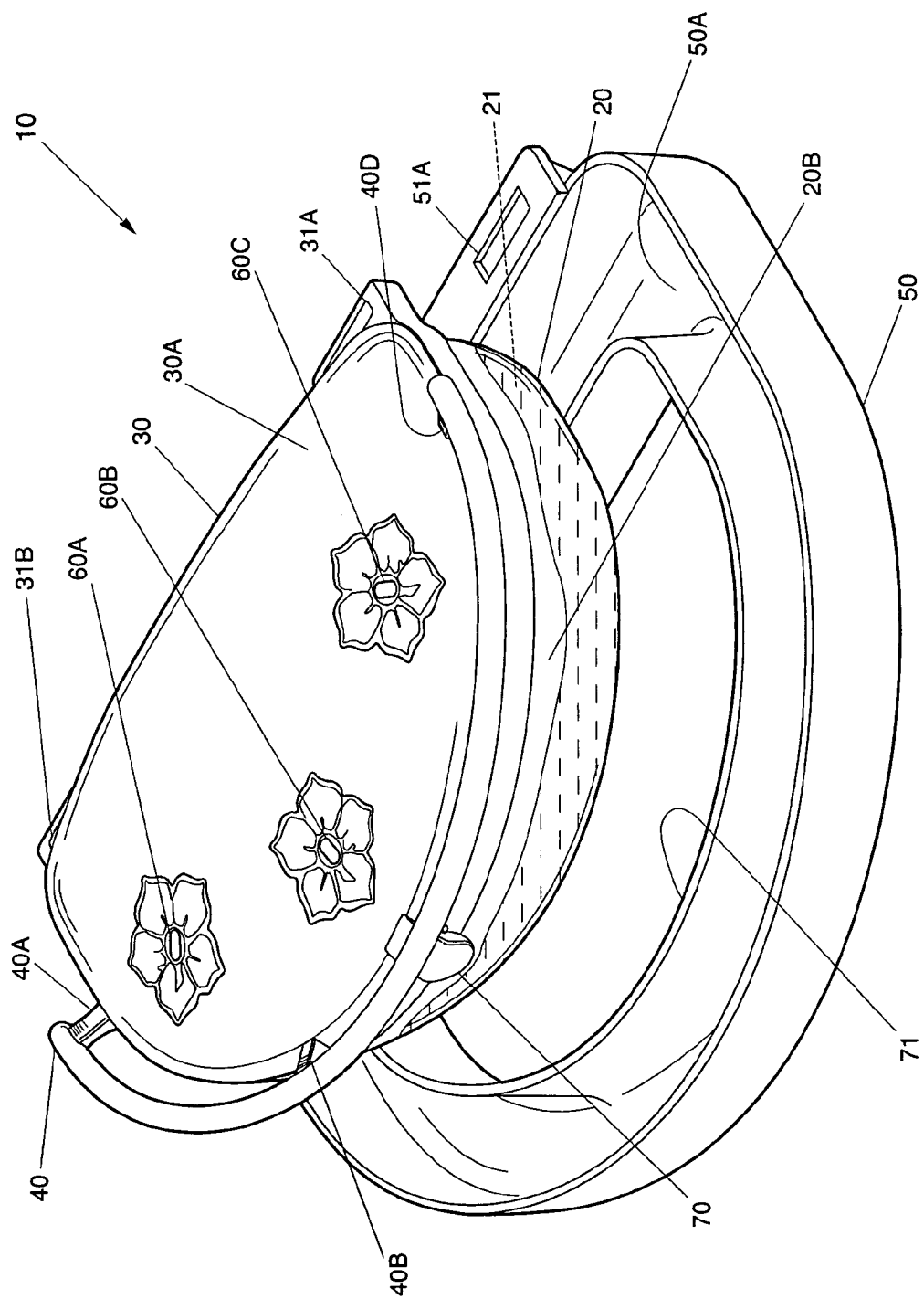
FIG. 4 is a perspective view of the present invention of FIG. 2 with an ant moat.

Referring to FIG. 4, an exploded view is shown of the nectar feeder 10 with the optional ant moat 50. The outer surface 20B of the base 20 is removably engaged within a seat 71 defined by the ant moat 50. Essentially, the nectar feeder 10 snaps into or rests on the seat 71 of the ant moat 50. The ant moat 50 may be secured or removed for easier cleaning of the ant moat 50 and nectar feeder 10. Feed ports 60A-60C are provided through which birds can access nectar in the base 20. The ant moat 50 defines a moat 50A that holds water or other liquids for thwarting ants or other insects from reaching the feed ports 60A-60C and nectar 21. The ant moat 50, when secured to the nectar feeder 10, extends about the periphery of the nectar feeder 10.

Figure 5:
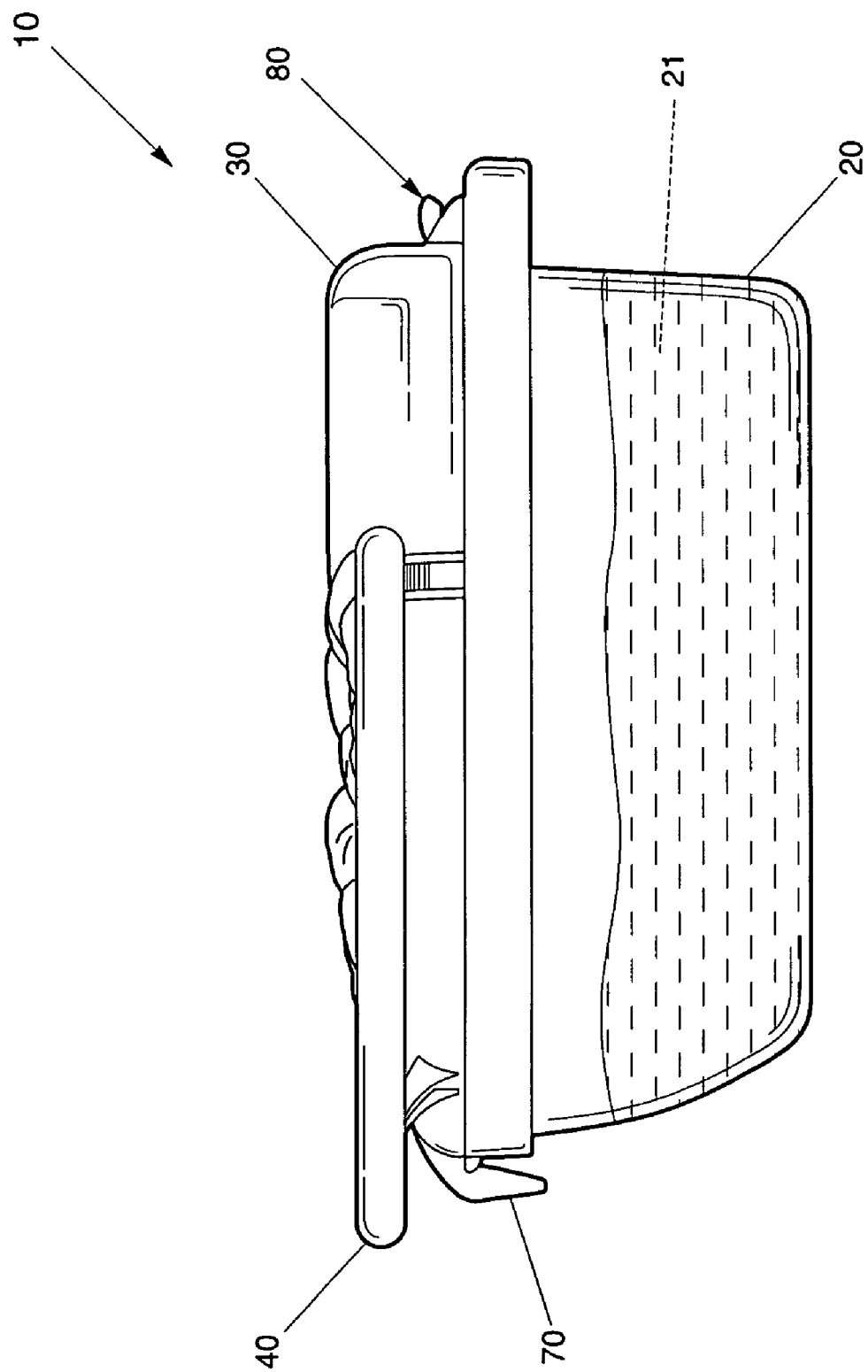
FIG. 5 is right side view of the present invention of FIG. 2.

Referring to FIG. 5, a latch 70 and hinge 80 are used to releasably secure the lid 30 to the base 20. The latch 70 has an upper portion fixedly attached to the lid 30. The latch 70 is positioned proximal the peripheral edge of the lid 30 for engagement with the base 20. The latch 70 has a lower portion downwardly depending for engagement with the base 20. In an alternative embodiment, the latch 70 may be replaced with other means known in the art or omitted entirely.

Figure 6:
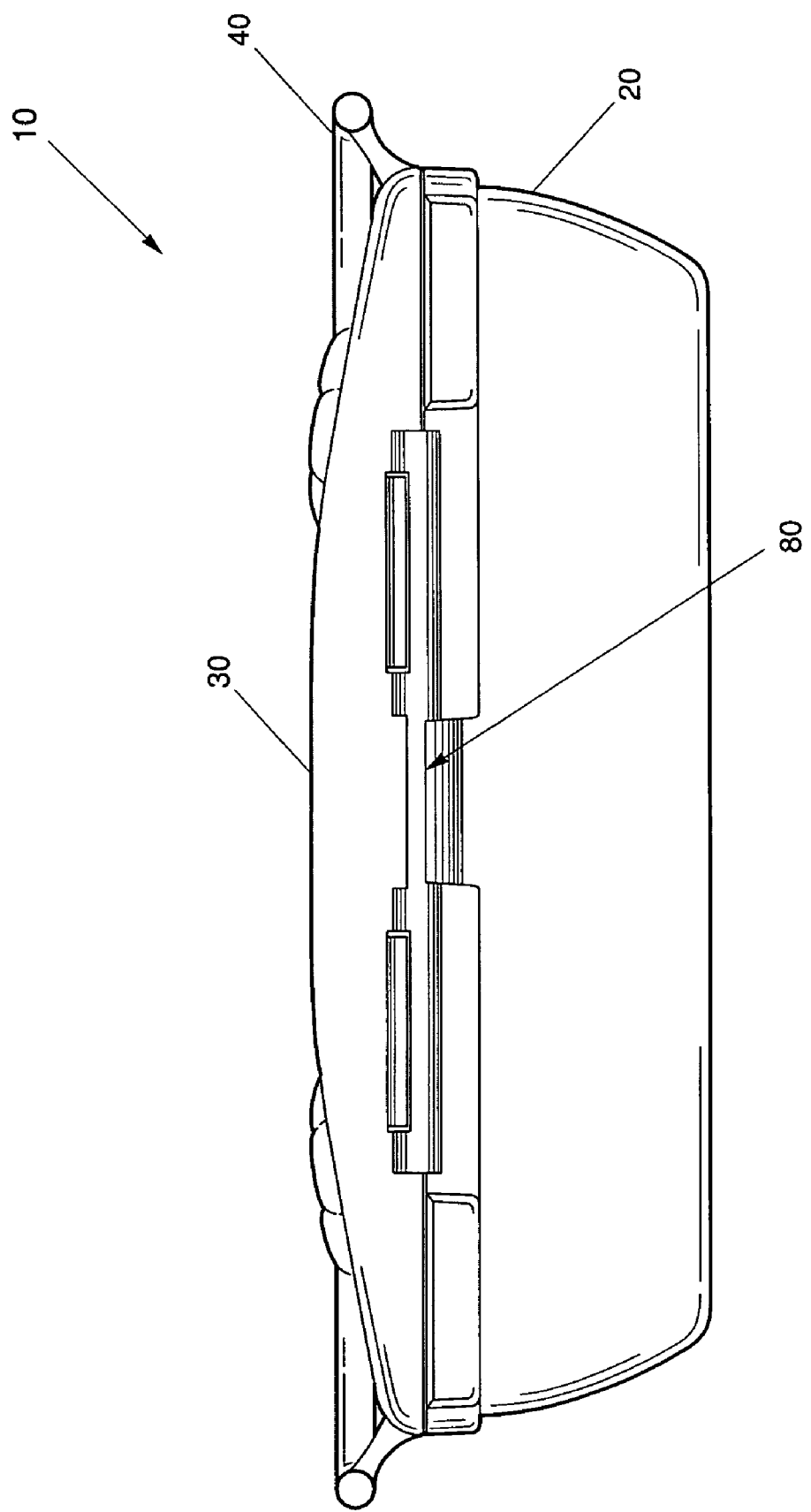
FIG. 6 is a rear view of the present invention of FIG. 2.
Figure 7:
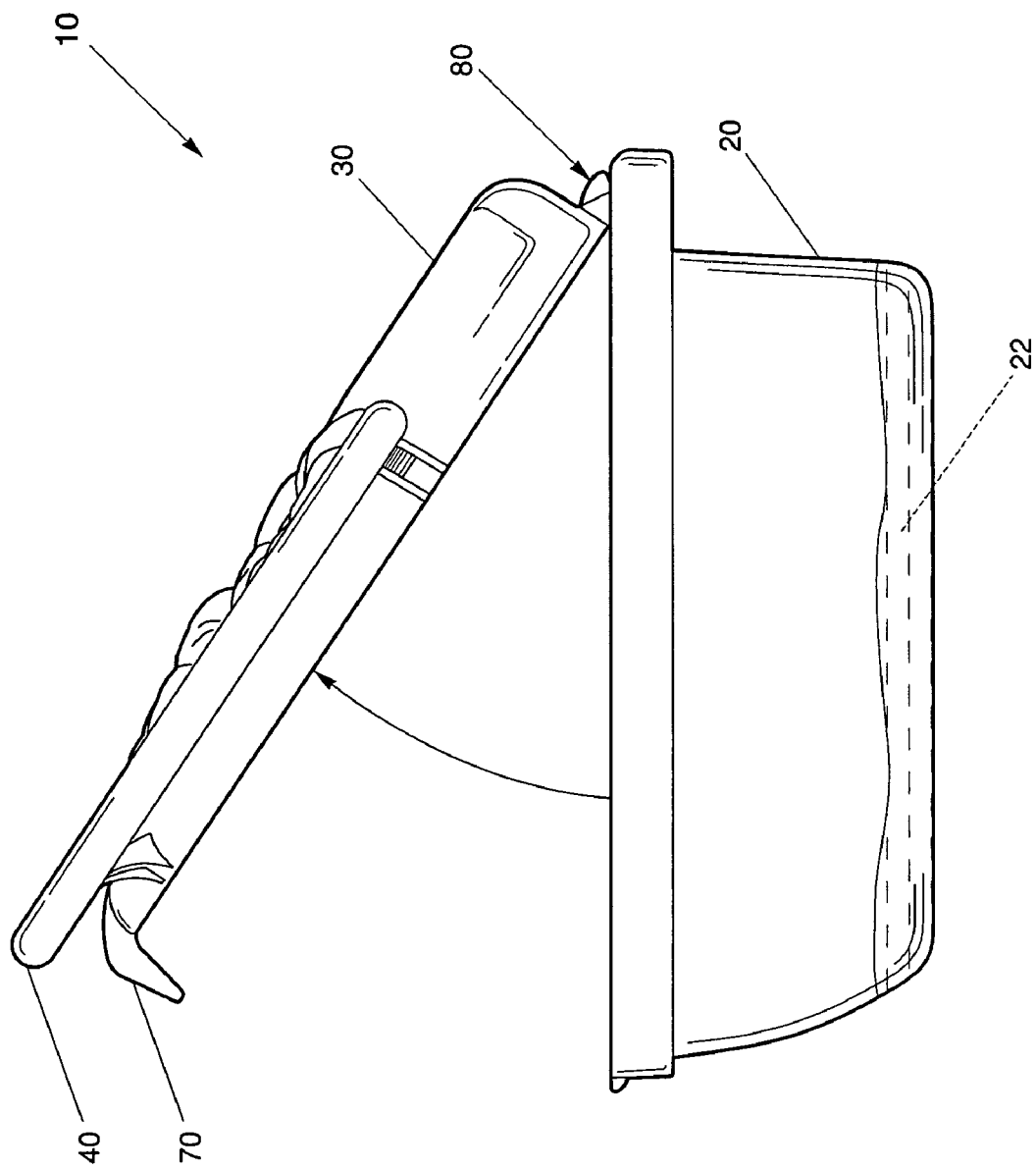
FIG. 7 is right side view of the present invention of FIG. 2 with the lid in a partially open position.

Referring to FIGS. 6 and 7, the lid 30 is hingedly connected to the base 20 using the hinge 80. The hinge 80 is used to facilitate movement of the lid 30 relative to the base 20. The hinge 80 permits a range of movement suitable for pivoting the lid 30 away from the open top end of the base 20 for refilling the nectar.

For example, referring to FIG. 7, when the nectar feeder 10 needs refilling with nectar feed 21, the latch 70 is disengaged. The user then pivots the lid 40 about the hinge 80 away from the base 20. The lid 30 hingedly moves relative to the base 20 to provide access to the reservoir in the base 20. Once the distance between the lid 30 and the base 20 is sufficient, nectar feed 21 is introduced into the reservoir in the base 20 for storage and the lid 30 is then closed to engage the latch 70.

Figure 8:
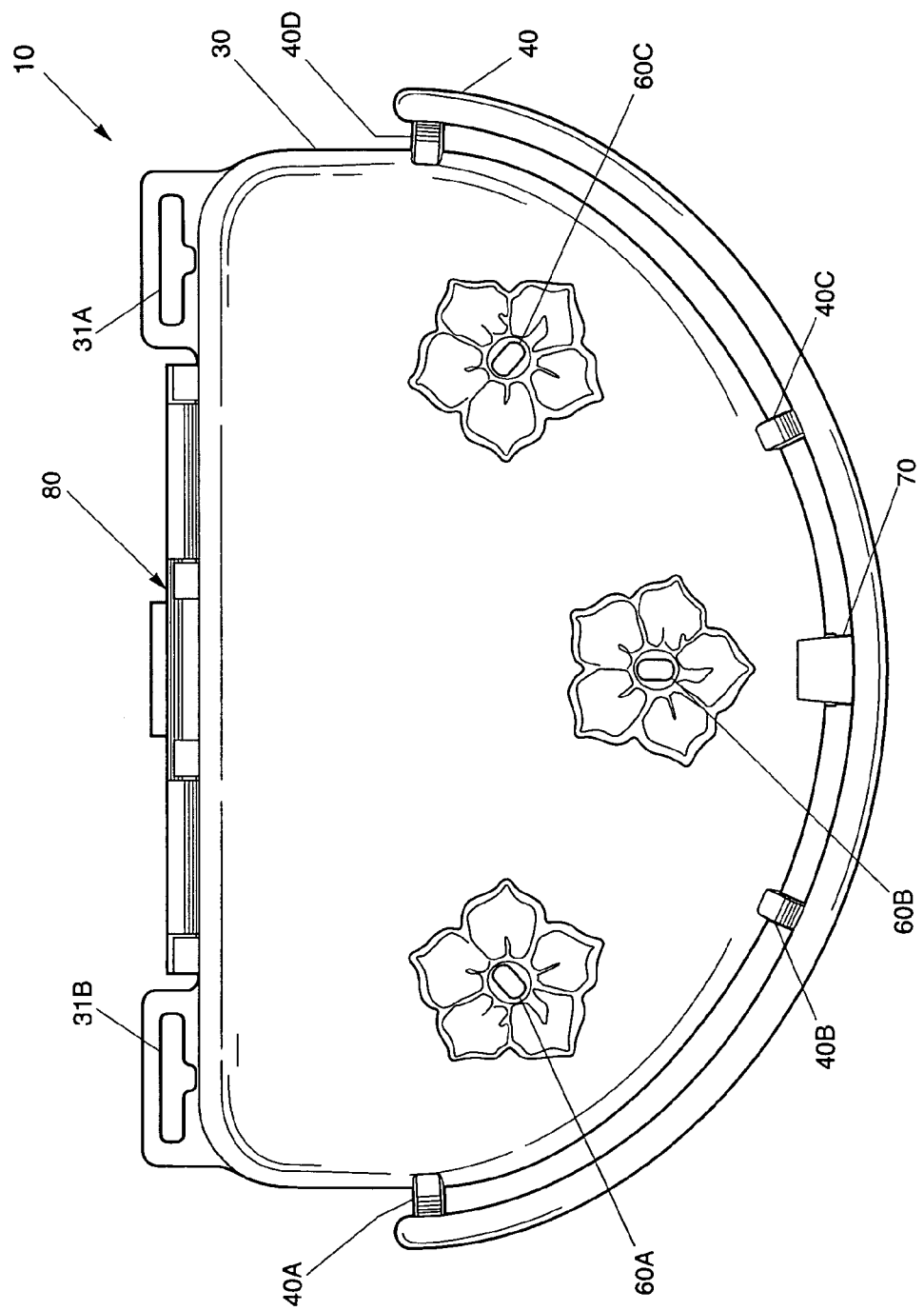
FIG. 8 is a top view of the present invention of FIG. 2.
Figure 9:
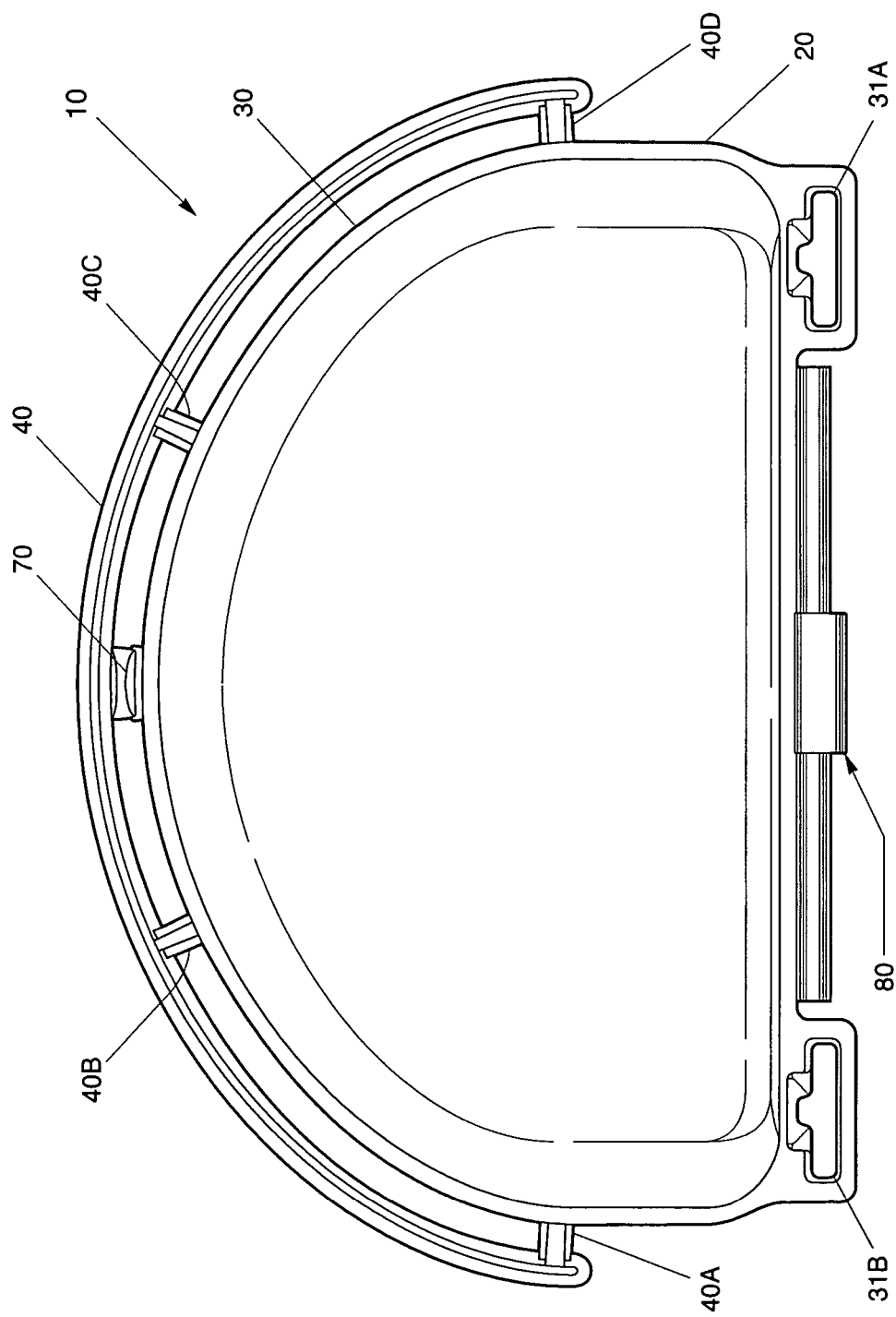
FIG. 9 is a bottom view of the present invention of FIG. 2.

Referring to FIGS. 8 and 9, the lid 30 has a raised support 40 or perch extending from an upper surface of the lid 30. The raised support 40, in one embodiment, is a raised peripheral support 40 attached to four support arms 40A,40B,40C,40D which are attached to the lid 30. It should be noted that the raised support 40 may extend from various portions of the lid 30 besides the periphery. The support 40 allows birds to rest while feeding on nectar from the feed ports 60A-60C. When the bird rests upon the raised support 40, a bird watcher may have an unobstructed view of the entire bird. It has been found that this raised support or perch 40 appears to be more comfortable for feeding birds. As a result, they are more likely to feed on a feeder with a perch of the present invention over a prior art feeder.

Each support arm 40A-40D is connected at a first end to the lid 30 and a second end attached to the support 40. The length of each support arm 40A-40D is sufficient for positioning the support 40 at a predetermined height above the lid 30. Note, the distance between the support 40 and the lid 30 allows for a direct view of a bird sitting on the support 40. It should also be noted that greater than or less than four support arms 40A-40D may be used to attach the support 40 to the lid 30.

The lid 30 also contains at least one feed port 60A-60C which are defined through the lid 30. The feed ports 60A-60C are substantially residing in the same horizontal plane. In one embodiment, the feed ports 60A-60C are equally spaced apart upon the lid 30 proximal the support 40. It is contemplated that the feed ports 60A-60C may be positioned anywhere on the lid 30 and unequally spaced apart. A number of feed ports 60A-60C are provided through the lid 30 to permit access to the nectar feed by the appropriate birds, such as hummingbird, orioles and butterflies, for example. The feed ports 60A-60C are preferably configured to appear as flowers, or other structures, to further attract birds to the feeder. The feed ports 60A-60C are positioned over the nectar so that feeding birds are aligned thereover for optimum access to the nectar therein.

Figure 10:
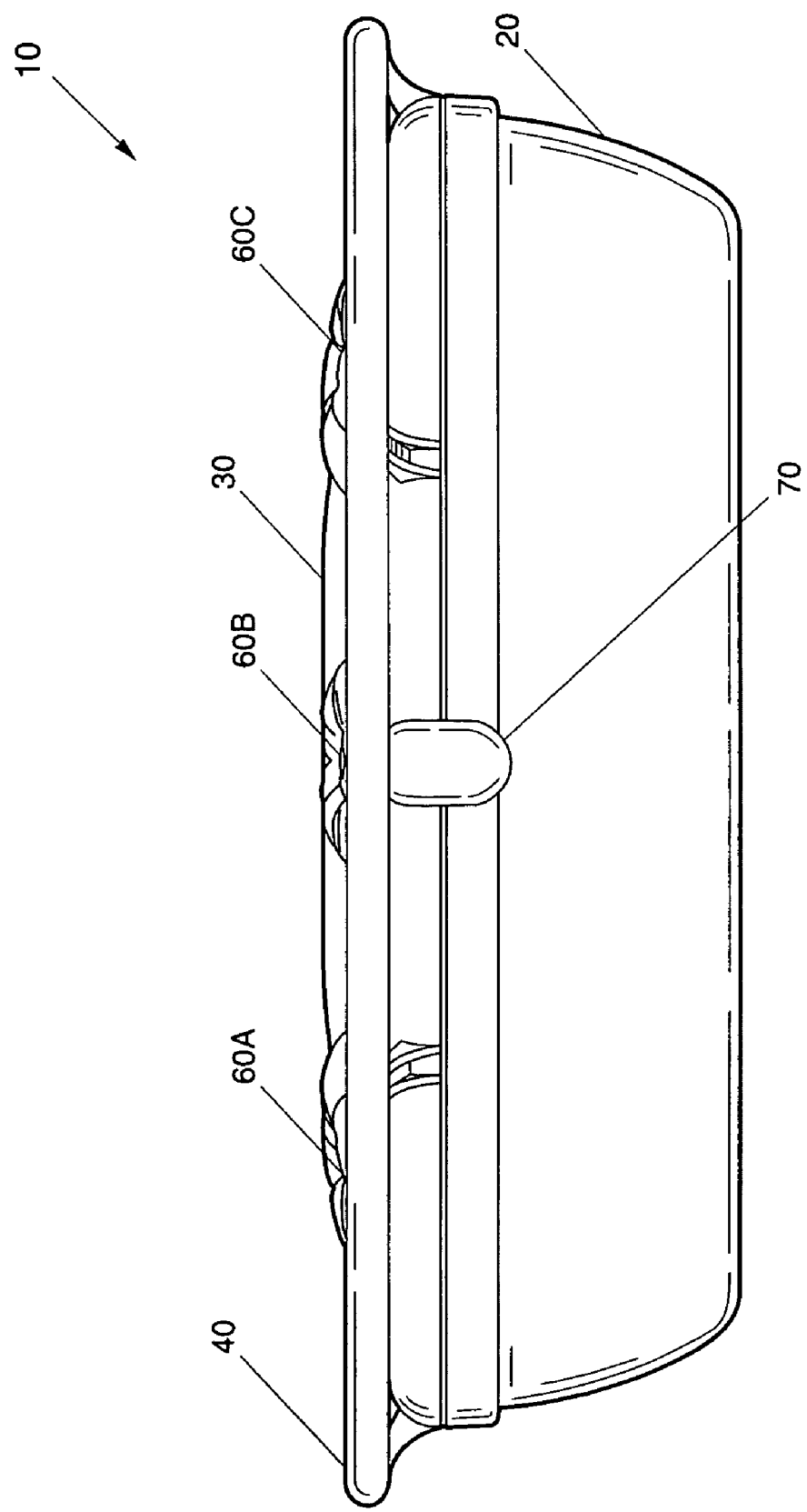
FIG. 10 is a front view of the present invention of FIG. 2.

As can be readily seen in FIG. 10, the feed ports 60A-60C and the support 40 are substantially residing in the same horizontal plane. The support 40 substantially resides or is co-planar with the horizontal plane containing the feed ports 60A-60C. By having the feed ports 60A-60C and the support 40 substantially residing in the same horizontal plane, the feeding bird is raised up so an observer is allowed to have an unobstructed view of a bird sitting on the support 40 while the bird is feeding via feed ports 60A-60C.

Figure 11:
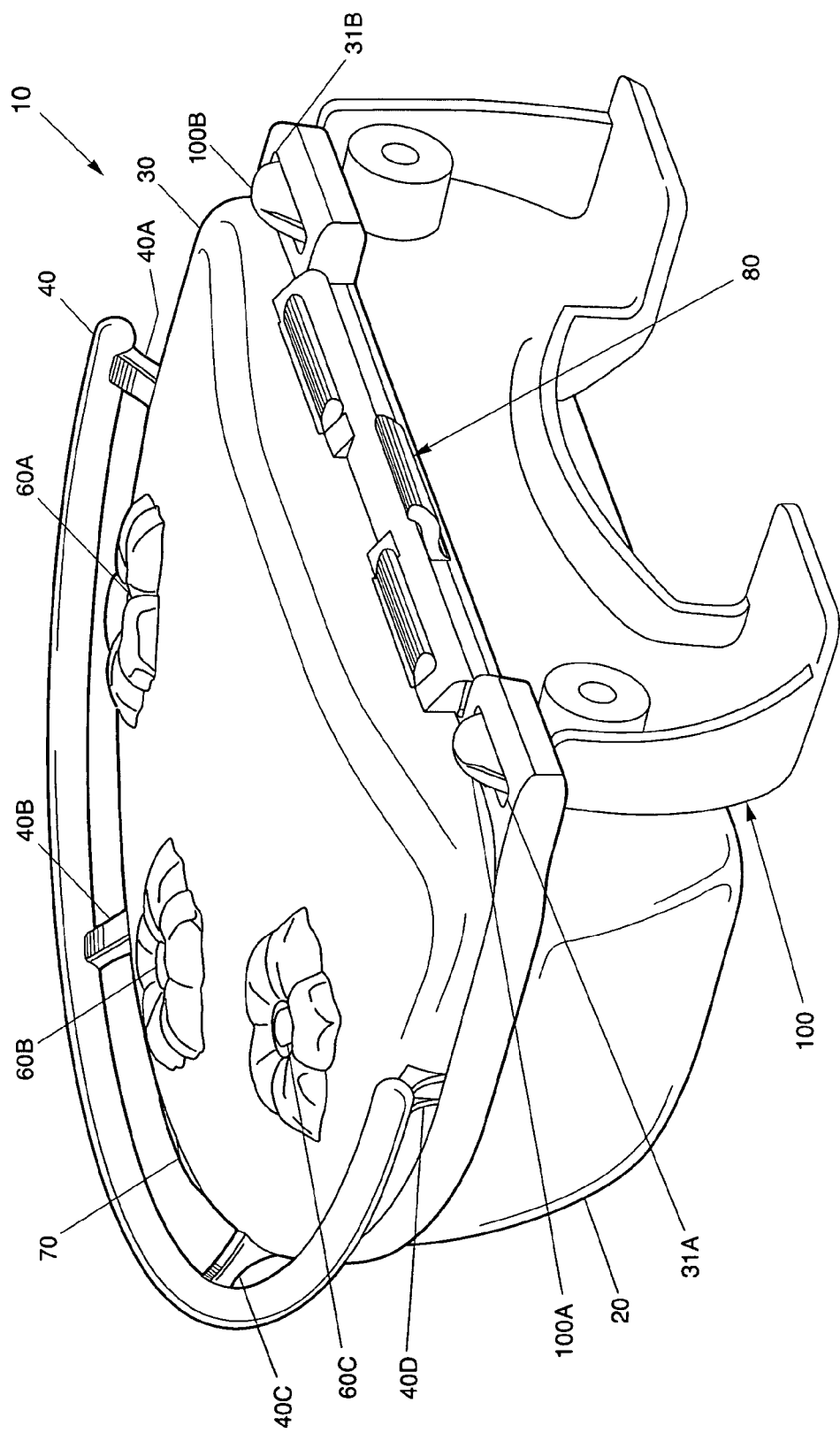
FIG. 11 is a rear perspective view of the present invention of FIG. 2 with a wall mounting.
Figure 12:
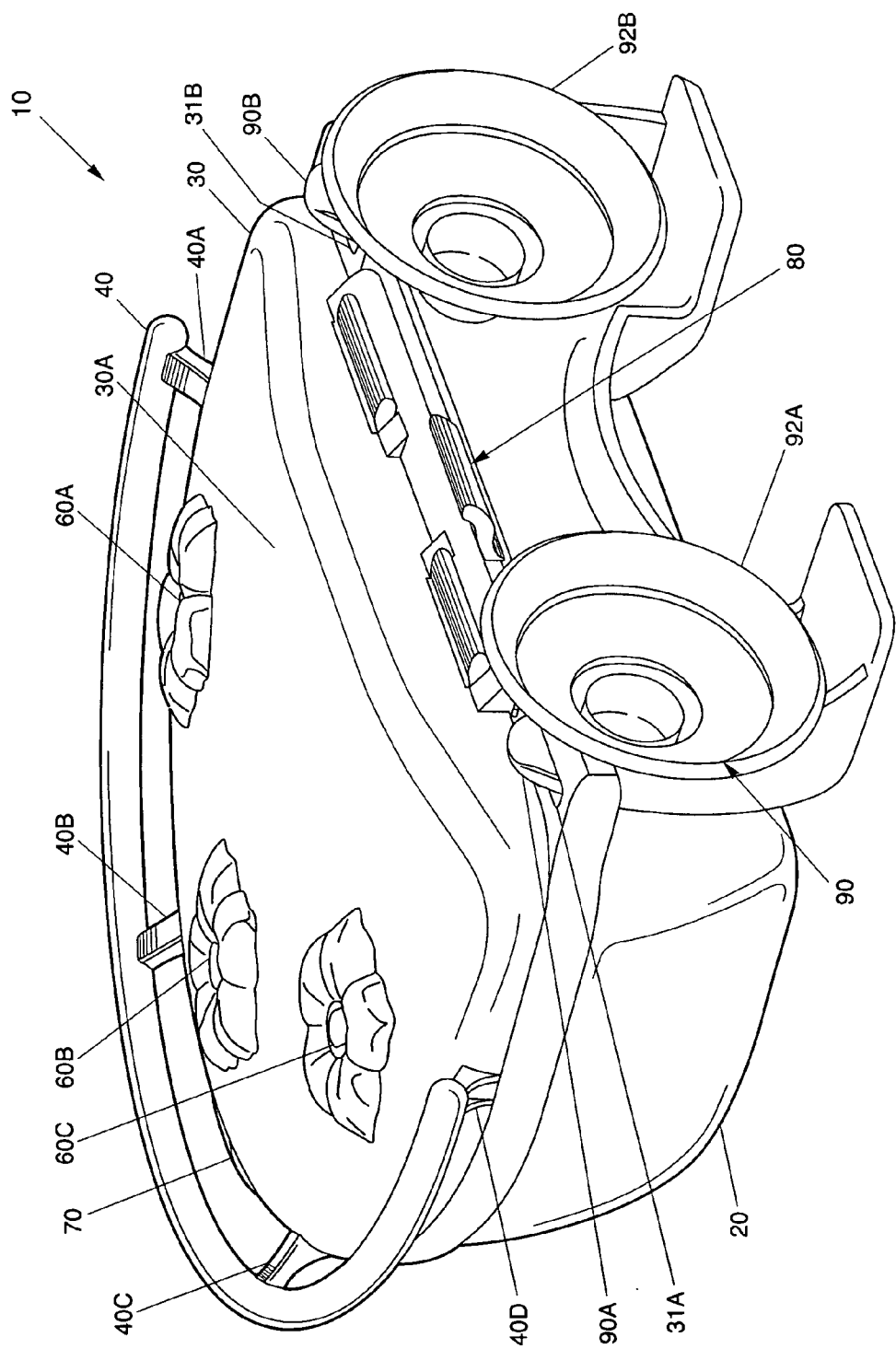
FIG. 12 is a rear perspective view of the present invention of FIG. 2 with suction cup mounting.

Referring to FIGS. 11 and 12, the nectar feeder 10 also includes a structure for attachment to a variety of surfaces. The structure for attachment may include a wall mounting 100, window mounting 90 including suction cups 92A, 92B, or any other structure or mechanism for attachment to surfaces. The surfaces for attachment include windows, posts, walls, or any other desired surface.

The wall mounting 100 or window mounting 90 is removably attached to mounting holes 31A, 31B defined within the lid 30. Both the wall mounting 100 and window mounting 90 have similar insert portions (100A, 100B and 90A, 90B respectively) for attaching to the mounting holes 31A, 31B. By using similar insert portions 100A, 100B and 90A, 90B and similar mounting holes 31A, 31B, the nectar feeder 10 allows for interchangeability of any means for attachment.

Figure 13:
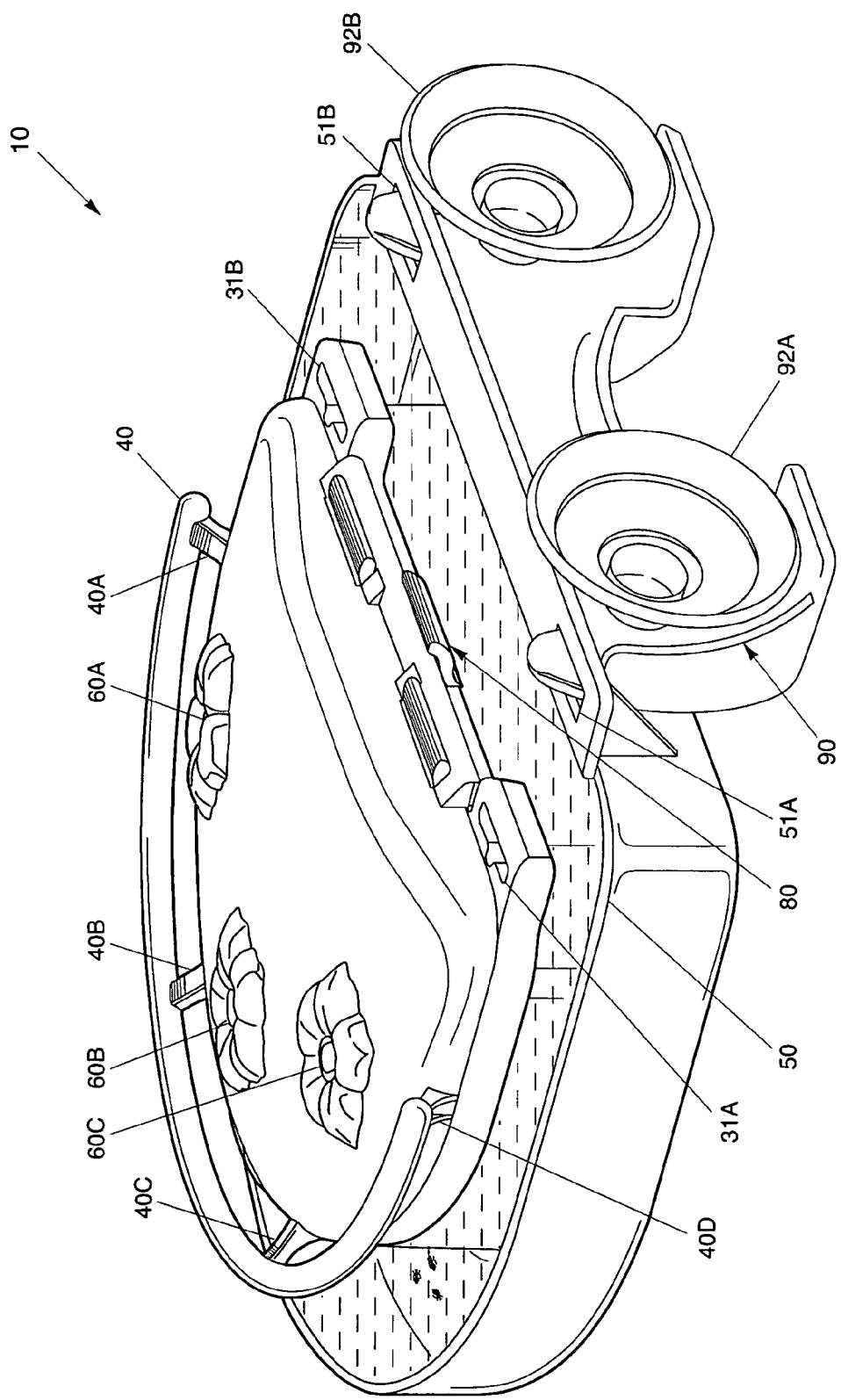
FIG. 13 is a rear perspective view of the present invention of FIG. 2 with an ant moat containing water.

Referring to FIG. 13, the nectar feeder 10 has an ant moat 50 removably attached along an outer periphery of the base 20 and a window mounting 90 attached to the ant moat 50. The window mounting 90 has insert portions 90A, 90B which insert through the respective mounting holes 51A, 51B defined within the ant moat 50. The ant moat 50 is filled with water or other liquid for preventing insects, such as ants, from gaining access to the feed ports 60A-60C and the nectar feed 21. The ant moat 50 has a depth and width sufficient for holding water suitable for thwarting or fending off ants or other pests.

Figure 14:
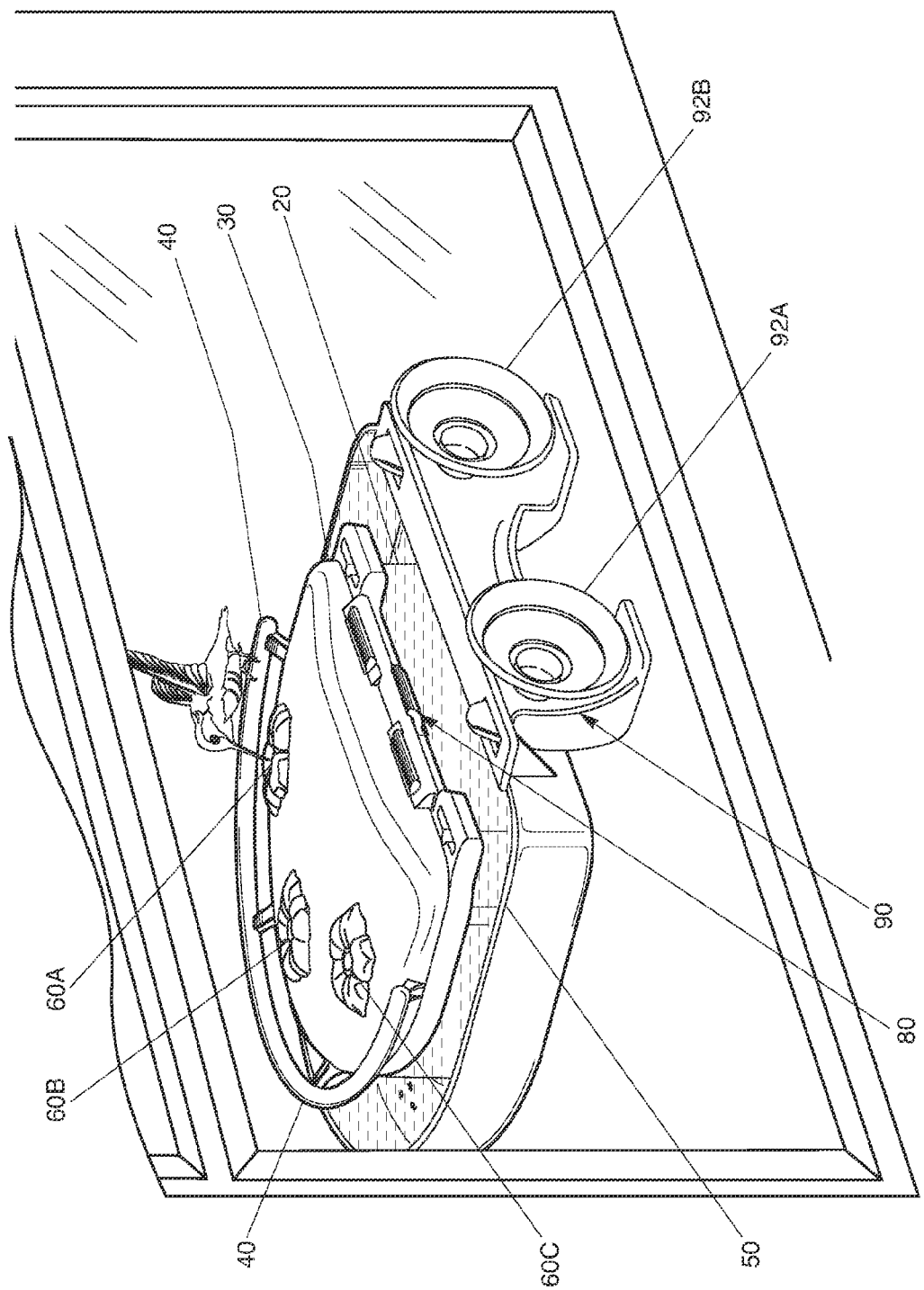
FIG. 14 is a rear perspective view of the present invention of FIG. 2 with a suction cup mounting and ant moat attached to a window as seen by an observer.

Referring to FIG. 14, the nectar feeder 10 is shown in operation at FIG. 14. By way of example, the nectar feeder 10 is attached to an ant moat 50 with a window mounting 90. The nectar feeder 10 may not have an ant moat 50 and different means for attachment to other surfaces besides windows. The suction cups 92A, 92B of the window mounting 90 are attached to a window pane. The bird sits on the support 40 while feeding on nectar feed moving through the feed ports 60A-60C. Since the feed ports 60A-60C are substantially aligned on the same horizontal plane as the support 40, the nectar feeder 10 provides the bird access to the feed ports 60A-60C while providing unobstructed views of the bird to a bird watcher.

Figure 15B:
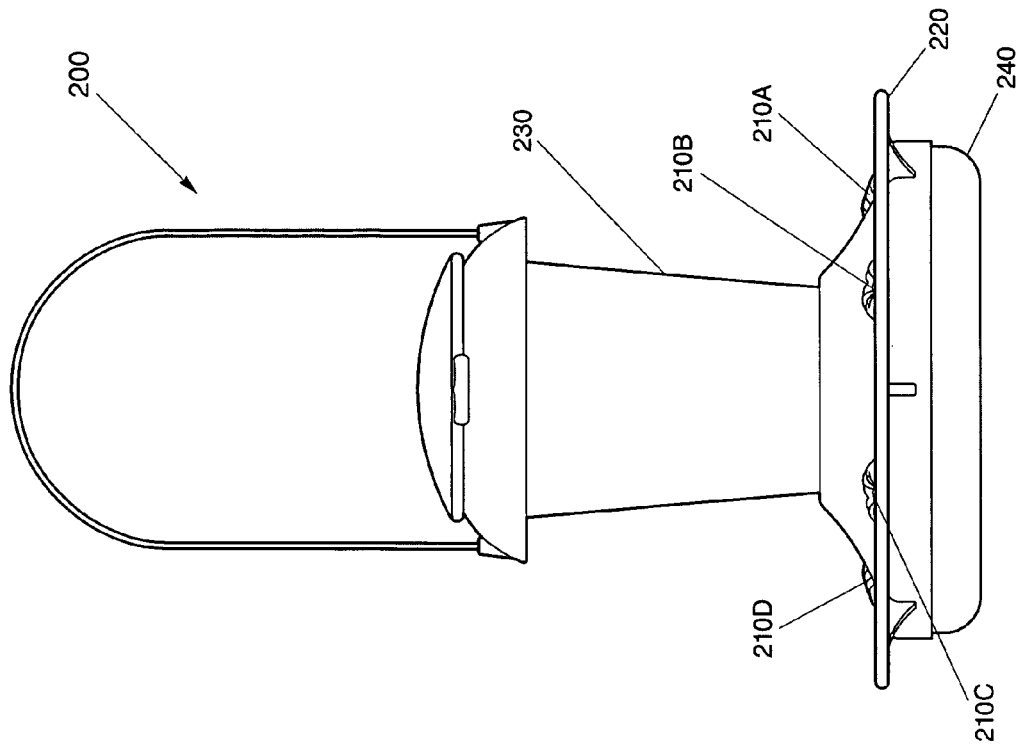
FIG. 15B is a front view of the embodiment of FIG. 15A.
Figure 15A:
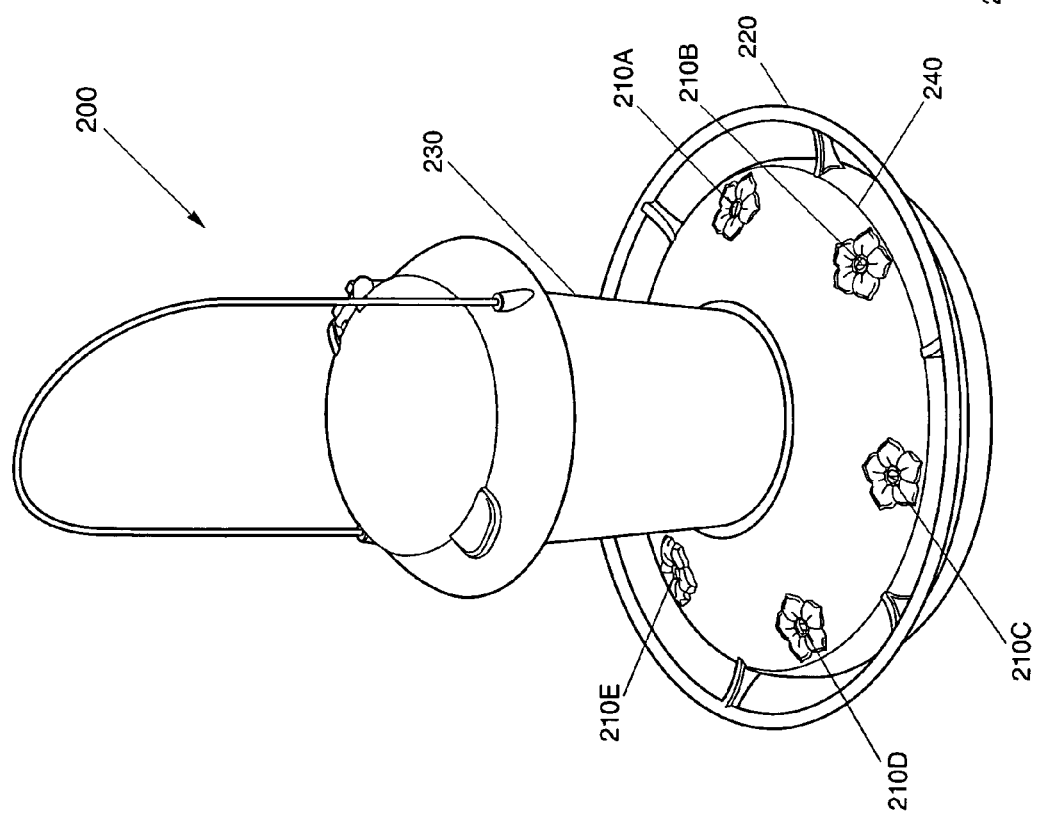
FIG. 15A is a perspective view of another embodiment of the present invention employed in a bottle type bird feeder.

Referring to FIGS. 15A and 15B, another embodiment 200 of the nectar feeder 10 is shown. The nectar feeder 200 has an elongated storage cylinder 230 connected to a base 240, otherwise known as a bottle type feeder. The base 240 has a raised support 220 extending about a periphery of an upper surface of the base 240 to provide a resting area for birds. Six feed ports 210A-E are defined within a top surface of the base 240. Similar to the nectar feeder 10 of FIG. 2, the feed ports 210A-E and the raised support 220 are substantially aligned on the same horizontal plane and take advantage of the features of the present invention.

The nectar feeder 10 of the present invention can have many different types of configurations. The nectar feeder 10 itself is typically made of plastic but can be made of virtually any type of material. Further, the nectar feeder 10 discussed herein is just one example of many configurations of feeders that can be accommodated by the method of filling of the present invention.

The nectar feeder 10 of the present invention has many advantages not found in the prior art. The nectar feeder 10 has feed ports 60A-60C substantially aligned on the same horizontal plane with the support 40 to provide unobstructed views of the bird during feeding. The nectar feeder 10 has a lid 30 hingedly connected to the base 20 to provide easier refilling of the nectar feed. The nectar feeder 10 has an ant moat 50 that is removably attached along a periphery of the base 20.

It would be appreciated by those skilled in the art that various changes and modifications can be made to the illustrated embodiments without departing from the spirit of the present invention. All such modifications and changes are intended to be covered by the appended claims.

What is claimed is:

1. A nectar feeder for birds, comprising:
    a base having an open top end and a side wall and defining a nectar reservoir therein;
    a lid interfittingly engaged with the top end of the base, the lid integrally formed with a perch configured for a bird to rest extending above an upper surface of the lid and lying in a plane that is different than a plane in which an upper edge of the base resides;
    at least one feed port with an outer end and an inner end defined through the lid, the outer end of the feed port and the perch being substantially aligned on the same horizontal plane;
    a means for releasably securing the lid to the base; and
    a moat extending about a periphery of the base; the moat being removably attached to the base, the moat including an inner wall defining a seat for engaging the base which serves as a guide to properly orient the nectar reservoir.

2. The nectar feeder of claim 1, wherein the lid is hingedly connected to the base using a non-flexible hinge mechanism.

3. The nectar feeder of claim 1, wherein the at least one feed port defines the only aperture on an upper surface of the lid.

4. A window-mount nectar feeder for birds, comprising:
    a base having an open top end and a side wall and defining a nectar reservoir therein; the base having a planar shape with at least one substantially flattened sidewall with an outer edge having a mounting area with means for attaching the base to a window; the window having an inner side and an outer side; the flattened sidewall being proximal to the outer side of the window with the sidewall being substantially parallel therewith; the flattened portion of the base defining a first peripheral portion of the base and the remaining peripheral portion of the base defining a second peripheral portion of the base;
    a lid interfittingly engaged with a top end of the base, the lid positioned on a first horizontal plane, the lid having a raised support perch positioned on a second horizontal plane above the first horizontal plane of the lid, the first horizontal plane and the second horizontal plane not being co-planar;
    a means for releasably securing the lid to the base;
    at least one feed port with an outer end and an inner end defined through the lid, the outer end of the feed port and the perch being aligned on the second horizontal plane; and
    the nectar reservoir residing completely in the base and below the at least one feed port and the lid; the perch residing only proximal to the second peripheral portion of the base leaving a direct view to the feed ports and perch through the window from the inner side of the window.

5. The nectar feeder of claim 4, wherein the lid is hingedly connected to the base.

6. The nectar feeder of claim 4, wherein the at least one feed port defines the only aperture on an upper surface of the lid.

7. The nectar feeder of claim 4, further comprising:
a moat removably attached about a periphery of the base.

8. The nectar feeder of claim 7, wherein the moat defines a seat for engaging the base which serves as a guide to properly orient the nectar feeder.

9. The nectar feeder of claim 4, wherein the lid is integrally formed with the perch.

10. A nectar feeder for birds, comprising:
a base having an open top end and a side wall and defining a nectar reservoir therein;
a lid interfittingly engaged with the top end of the base, the lid integrally formed with a perch configured for a bird to rest extending above an upper surface of the lid and lying in a plane that is different than a plane in which an upper edge of the base resides;
at least one feed port with an outer end and an inner end defined through the lid, the outer end of the feed port and the perch being substantially aligned on the same horizontal plane;
a latch and hinge for releasably securing the lid to the base; and wherein the nectar reservoir resides completely in the base and below the at least one feed port and the lid.

11. The nectar feeder of claim 10, further comprising:
a moat extending about a periphery of the base; the moat being removably attached to the base, the moat defining a seat for engaging the base which serves as a guide to properly orient the nectar feeder.

12. The nectar feeder of claim 10, wherein the at least one feed port defines the only aperture on an upper surface of the lid.

* * * * *